United States Patent
Delcroix et al.

(10) Patent No.: US 11,865,530 B2
(45) Date of Patent: Jan. 9, 2024

(54) PROCESS FOR PREPARING A FISCHER-TROPSCH CATALYST IN THE PRESENCE OF AN ADDITIVE AND OF A SPECIFIC CALCINING STEP

(71) Applicant: IFP Energies nouvelles, Rueil Malmaison (FR)

(72) Inventors: Damien Delcroix, Rueil-Malmaison (FR); Romain Chenevier, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/669,015

(22) Filed: Feb. 10, 2022

(65) Prior Publication Data
US 2022/0250047 A1 Aug. 11, 2022

(30) Foreign Application Priority Data
Feb. 11, 2021 (FR) .................... 21/01.299

(51) Int. Cl.
| | | |
|---|---|---|
| *B01J 37/02* | (2006.01) | |
| *B01J 6/00* | (2006.01) | |
| *B01J 23/75* | (2006.01) | |
| *B01J 23/755* | (2006.01) | |
| *B01J 35/00* | (2006.01) | |
| *C10G 2/00* | (2006.01) | |
| *B01J 21/04* | (2006.01) | |
| *B01J 21/08* | (2006.01) | |

(52) U.S. Cl.
CPC .......... *B01J 37/0203* (2013.01); *B01J 6/001* (2013.01); *B01J 23/75* (2013.01); *B01J 23/755* (2013.01); *B01J 35/0006* (2013.01); *B01J 37/0205* (2013.01); *B01J 37/0209* (2013.01); *C10G 2/332* (2013.01); *B01J 21/04* (2013.01); *B01J 21/08* (2013.01)

(58) Field of Classification Search
CPC . B01J 6/001; B01J 21/005; B01J 21/04; B01J 21/08; B01J 21/12; B01J 23/005; B01J 35/0006; B01J 35/1019; B01J 35/1042; B01J 37/0203; B01J 37/0205; B01J 37/0209; B01J 37/088; B01J 37/75; B01J 37/755; B01J 2523/00; C10G 2/331; C10G 2/332; Y02P 30/20
See application file for complete search history.

(56) References Cited

U.S. PATENT DOCUMENTS

| | | | |
|---|---|---|---|
| 10,618,036 B2 | 4/2020 | Decottignies et al. | |
| 11,161,099 B2 | 11/2021 | Delcroix et al. | |
| 2005/0026776 A1* | 2/2005 | Yamada ............... | B01J 23/75 |
| | | | 502/260 |
| 2018/0280939 A1* | 10/2018 | Maury ............... | B01J 23/75 |
| 2019/0143306 A1 | 5/2019 | Decottignies et al. | |
| 2020/0129967 A1 | 4/2020 | Delcroix et al. | |

FOREIGN PATENT DOCUMENTS

| | | | | |
|---|---|---|---|---|
| CN | 109647405 | * | 4/2019 | ............. B01J 23/75 |
| EP | 3643767 | * | 4/2020 | ............. C10G 2/00 |
| FR | 3050660 | * | 11/2017 | ............. B01J 23/75 |
| FR | 3050662 A1 | | 11/2017 | |
| FR | 3087672 A1 | | 5/2020 | |
| WO | 2017186407 A1 | | 11/2017 | |

OTHER PUBLICATIONS

Machine Translation of CN 109647405 (Year: 2019).*
Machine Translation of EP 3643767 (Year: 2020).*
Search Report for related French Patent Application No. 21/01.299 dated Oct. 6, 2021.
English Abstract of FR3050662, Publication Date: Nov. 3, 2017.

* cited by examiner

*Primary Examiner* — Brian A McCaig
(74) *Attorney, Agent, or Firm* — Millen, White, Zelano & Branigan, P.C.; Csaba Henter

(57) ABSTRACT

Process for preparing a catalyst containing an active phase based on a group VIII metal and a porous support, comprising the following steps:
bringing said support into contact with an organic compound comprising at least oxygen and/or nitrogen;
bringing the porous support into contact with a solution containing a precursor of the active phase comprising a group VIII metal;
drying the catalyst precursor at a temperature of less than 200° C. so as to obtain a dried catalyst precursor;
calcining the dried catalyst precursor at a temperature of between 200° C. and 1100° C. under a stream of inert gas and/or of oxidizing gas, it being understood that the velocity of said gas stream, defined as the mass flow rate of said gas stream per volume of catalyst per hour, is greater than 1 litre per gram of catalyst and per hour.

19 Claims, No Drawings

PROCESS FOR PREPARING A FISCHER-TROPSCH CATALYST IN THE PRESENCE OF AN ADDITIVE AND OF A SPECIFIC CALCINING STEP

TECHNICAL FIELD

The present invention relates to the field of reactions for the synthesis of hydrocarbons from a gas mixture comprising carbon monoxide and hydrogen, generally known as Fischer-Tropsch synthesis. More particularly, the present invention relates to the field of the preparation of catalysts used in Fischer-Tropsch syntheses.

PRIOR ART

Fischer-Tropsch synthesis processes make it possible to obtain a wide range of hydrocarbon cuts from the CO+$H_2$ mixture, commonly referred to as synthesis gas. The overall equation of Fischer-Tropsch synthesis can be written in the following way:

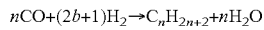

$$nCO+(2b+1)H_2 \rightarrow C_nH_{2n+2}+nH_2O$$

Fischer-Tropsch synthesis is at the core of processes for converting natural gas, coal or biomass into fuels or into intermediates for the chemical industry. These processes are referred to as GTL ("Gas to Liquids") in the case of the use of natural gas as initial feedstock, CTL ("Coal to Liquids") for coal, and BTL ("Biomass to Liquids") for biomass.

In each of these cases, the initial feedstock is first of all gasified into a synthesis gas which comprises a mixture of carbon monoxide and dihydrogen. The synthesis gas is subsequently converted mainly into paraffins by virtue of the Fischer-Tropsch synthesis, and these paraffins can subsequently be converted into fuels by a hydroisomerization-hydrocracking process. For example, conversion processes such as hydrocracking, deparaffinizing and hydroisomerization of heavy (C16+) cuts make it possible to produce various types of fuels in the middle-distillate range: gas oil (180-370° C. cut) and kerosene (140-300° C. cut). The lighter, C5-C15, fractions can be distilled and used as solvents.

The Fischer-Tropsch synthesis reaction can be carried out in various types of reactors (fixed-bed, mobile, or three-phase (gas, liquid, solid) for example of perfectly stirred autoclave or slurry bubble column type), and the reaction products have in particular the characteristic of being free of sulfur-comprising, nitrogenous or aromatic-type compounds.

In one embodiment in a reactor of slurry bubble column type (or else "slurry" type in a simplified expression), which uses a divided catalyst in the form of very fine power, typically about a few tens of micrometres, this powder forming a suspension with the reaction medium.

The Fischer-Tropsch reaction is carried out conventionally between 1 and 4 MPa (10 and 40 bar), at temperatures conventionally of between 200° C. and 350° C. The reaction is globally exothermic, which requires particular attention to the use of the catalyst.

The catalysts used in Fischer-Tropsch synthesis are usually supported catalysts based on alumina, silica or silica-alumina or combinations of these supports, the active phase mainly consisting of iron (Fe) or cobalt (Co) optionally doped with a noble metal such as Pt, Rh or Ru.

The addition of an organic compound to Fischer-Tropsch catalysts to improve their activity was recommended by those skilled in the art.

Many documents describe the use of various ranges of organic compounds as additives, such as nitrogen-based organic compounds and/or oxygen-based organic compounds.

In particular, patents U.S. Pat. Nos. 5,856,260 and 5,856,261 respectively teach the introduction, during the preparation of the catalyst, of polyols of general formula $CnH_{2n+2}O_x$ with n being an integer between 2 and around 6, and x being an integer between 2 and 11 or sugars of monosaccharide or disaccharide type, sucrose being particularly preferred.

Patent application US 2005/0026776 teaches the use of chelating compounds of the following types: nitrilotriacetic acid (NTA), trans-1,2-diaminocyclohexane-N,N,N',N'-tetraacetic acid (CyDTA) or ethylenediaminetetraacetic acid (EDTA), or else glycine, aspartic acid or citric acid for obtaining a catalyst with a reduced size of $Co_3O_4$ crystallites. Other documents teach the use of polyethers (WO 2014/092278 and WO 2015/183061), glyoxylic acid (WO 2015/183059), unsaturated dicarboxylic acids (US 2011/0028575) or else of multifunctional carboxylic acids of formula HOOC—$(CRR^1)_n$—COOH with n 1 in the preparation of Fischer-Tropsch catalysts (WO 98/47618).

Patent application US 2014/0353213 describes the use of lactams or cyclic esters of lactone type containing one oxygen atom in the ring (β-propiolactone, γ-butyrolactone, δ-valerolactone) or several oxygen atoms in the ring (propylene carbonate) in order to increase the activity of a catalyst of CoMo and NiMo type used in hydrodesulfurization of a diesel cut. Document WO 2012/013866 discloses the use of a cyclic oligosaccharide, in particular cyclodextrin, as additive of a Fischer-Tropsch catalyst. This document also describes the use of a support based on silica-alumina optionally containing a spinel.

Finally, document FR3050659 discloses a catalyst containing an active cobalt phase, deposited on a support comprising alumina, silica or silica-alumina, said support containing a mixed oxide phase containing cobalt and/or nickel, said catalyst having been prepared by introducing at least one organic compound comprising at least one ester function during its preparation.

Continuing its research into improving the performance levels of catalysts in the field of Fischer-Tropsch synthesis, the applicant has discovered, surprisingly, that recourse to a specific calcining step after the addition of the active phase and of the organic compound (additive) on the support, makes it possible to significantly increase the catalytic activity of the catalyst while at the same time preserving good selectivity. Although the step of calcining the catalyst precursor causes at least partial, or even total, decomposition of the organic compound present on the support of the catalyst, said compound has left an imprint on the catalyst.

SUBJECT OF THE INVENTION

A subject of the present invention is a process for preparing a catalyst containing an active phase based on at least one group VIII metal and a porous support based on alumina, silica or silica-alumina, said catalyst being prepared by means of at least the following steps:
  a) a step of bringing said support into contact with at least one organic compound comprising at least oxygen and/or nitrogen;
  b) a step of bringing said porous support into contact with at least one solution containing at least one precursor of the active phase comprising at least one group VIII metal, it being possible for steps a) and b) to be carried out separately, in any order, or simultaneously;

c) a step of drying the catalyst precursor obtained on conclusion of the sequence of steps a) and/or b) at a temperature of less than 200° C., so as to obtain a dried catalyst precursor;

d) a step of calcining the dried catalyst precursor obtained on conclusion of step c) at a temperature of between 200° C. and 1100° C. under a stream of inert gas and/or of oxidizing gas, it being understood that the velocity of said gas stream, defined as the volume flow rate of said gas stream per mass of catalyst per hour, is greater than 1 litre per gram of catalyst and per hour.

Advantageously, the velocity of the gas stream in step d) is between 1 and 5 litres per gram of catalyst and per hour.

Advantageously, step a) is carried out before step b).

According to one or more embodiments, said organic compound is chosen from a compound comprising one or more chemical functions chosen from a carboxylic, alcohol, ester, amine, amide, ether, dilactone, carboxyanhydride, aldehyde, ketone, nitrile, imide, oxime or urea function.

According to one or more embodiments, said organic compound comprises at least one carboxylic function chosen from ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

According to one or more embodiments, said organic compound comprises at least one alcohol function chosen from methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

According to one or more embodiments, said organic compound comprises at least one ester function chosen from a γ-lactone or a δ-lactone containing between 4 and 8 carbon atoms, γ-butyrolactone, γ-valerolactone, methyl laurate, dimethyl malonate, dimethyl succinate and propylene carbonate.

According to one or more embodiments, said organic compound comprises at least one amine function chosen from aniline, ethylenediamine, diaminohexane, tetramethylenediamine, hexamethylenediamine, tetramethylethylenediamine, tetraethylethylenediamine, diethylenetriamine and triethylenetetramine.

According to one or more embodiments, said organic compound comprises at least one amide function chosen from formamide, N-methylformamide, N,N-dimethylformamide, 2-pyrrolidone, N-methyl-2-pyrrolidone, gamma-valerolactam and N,N'-dimethylurea.

According to one or more embodiments, said organic compound comprises at least one carboxyanhydride function chosen from the group of the O-carboxyanhydrides consisting of 5-methyl-1,3-dioxolane-2,4-dione and 2,5-dioxo-1,3-dioxolane-4-propanoic acid, or from the group of the N-carboxyanhydrides consisting of 2,5-oxazolidinedione and 3,4-dimethyl-2,5-oxazolidinedione.

According to one or more embodiments, said organic compound comprises at least one dilactone function chosen from the group of the cyclic dilactones having 4 ring members consisting of 1,2-dioxetanedione, or from the group of the cyclic dilactones having 5 ring members consisting of 1,3-dioxolane-4,5-dione, 1,5-dioxolane-2,4-dione, and 2,2-dibutyl-1,5-dioxolane-2,4-dione, or from the group of the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, or from the group of the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

According to one or more embodiments, said organic compound comprises at least one ether function comprising at most two ether functions and not comprising any hydroxyl groups, chosen from the group of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of the cyclic ethers consisting of tetrahydrofuran, 1,4-dioxane and morpholine.

According to one or more embodiments, the molar ratio of the organic compound introduced during step a) relative to the group VIII metal element introduced in step b) is between 0.01 and 2.0 mol/mol.

According to one or more embodiments, the content of VIII metal introduced during step b) is between 1% and 60% by weight expressed as group VIII metal element relative to the total weight of the catalyst.

According to one or more embodiments, the group VIII metal is cobalt.

According to one or more embodiments, said process comprising a step a0) in which said porous support is brought contact with at least one solution containing at least one precursor of cobalt and/or of nickel, then drying and calcining at a temperature of between 700° C. and 1200° C., so as to obtain a mixed oxide phase containing cobalt and/or nickel in the support.

According to one or more embodiments, the content of the mixed oxide phase in the support is between 0.1% and 50% by weight relative to the total weight of the support.

According to one or more embodiments, the silica content of said support is between 0.5% by weight and 30% by weight relative to the weight of the support before the formation of the mixed oxide phase when the support is a silica-alumina.

Another aspect of the invention relates to a Fischer-Tropsch process for synthesizing hydrocarbons, which comprises bringing a feedstock comprising synthesis gas into contact with at least one catalyst obtained by means of the preparation process according to the invention, under a total pressure of between 0.1 and 15 MPa, at a temperature of between 150° C. and 350° C., and at an hourly space velocity of between 100 and 20 000 volumes of synthesis gas per volume of catalyst and per hour with an $H_2/CO$ molar ratio of the synthesis gas of between 0.5 and 4.

DETAILED DESCRIPTION OF THE INVENTION

Definitions

In the following description, the groups of chemical elements are given according to the CAS classification (CRC Handbook of Chemistry and Physics, published by CRC Press, Editor in Chief D. R. Lide, 81st edition, 2000-2001). For example, group VIIIB according to the CAS classification corresponds to the metals from columns 8, 9 and 10 according to the new IUPAC classification.

Textural and structural properties of the support and of the catalyst described below are determined by the characterization methods known to those skilled in the art. The total pore volume and the pore distribution are determined in the present invention by mercury porosimetry (cf. Rouquerol F.; Rouquerol J.; Singh K. "Adsorption by Powders & Porous Solids: Principle, methodology and applications", Academic Press, 1999). More particularly, the total pore volume is measured by mercury porosimetry according to the standard ASTM D4284-92 with a wetting angle of 140°, for example by means of an Autopore III™ model device from the brand Micromeritics™. The specific surface area is determined in the present invention by the B.E.T. method, which method is described in the same reference book as the mercury porosimetry, and more particularly according to the standard ASTM D3663-03.

The contents of group VIII metal are measured by X-ray fluorescence.

Process for Preparing the Catalyst

A first subject according to the invention relates to a process for preparing a catalyst containing an active phase based on at least one group VIII metal and a porous support based on alumina, silica or silica-alumina, said catalyst being prepared by means of at least the following steps:

a) said support is brought into contact with at least one organic compound comprising at least oxygen and/or nitrogen;
b) said porous support is brought into contact with at least one solution containing at least one precursor of the active phase comprising at least one group VIII metal, it being possible for steps a) and b) to be carried out separately, in any order, or simultaneously;
c) the catalyst precursor obtained on conclusion of the sequence of steps a) and/or b) is dried at a temperature of less than or equal to 200° C., so as to obtain a dried catalyst precursor;
d) the dried catalyst precursor obtained on conclusion of step c) is calcined at a temperature greater than 200° C. and less than or equal to 1100° C. under a stream of inert gas and/or of oxidizing gas, it being understood that the velocity of said gas stream, defined as the mass flow rate of said gas stream per volume of catalyst per hour, is greater than 1 litre per gram of catalyst and per hour.

The steps of the process for preparing the catalyst used in the Fischer-Tropsch synthesis according to the invention are described in detail below.

Step a0) Formation of the Mixed Oxide Phase Containing Cobalt and/or Nickel (Optional)

In one embodiment according to the invention, the preparation process also comprises a step of forming the mixed oxide phase containing cobalt and/or nickel in the support comprising alumina, silica or silica-alumina by bringing it into contact with a solution containing at least one precursor of cobalt and/or of nickel, followed by drying and high-temperature calcining.

It is known that the presence of a mixed oxide phase containing cobalt and/or nickel in an alumina, silica or silica-alumina support makes it possible to improve the resistance to the phenomenon of chemical and mechanical attrition in a Fischer-Tropsch process, and therefore to stabilize the support.

The formation of the mixed oxide phase in the support, often referred to as the support stabilization step, may be carried out by any method known to those skilled in the art. It is generally carried out by introducing cobalt and/or nickel in the form of a salt precursor, for example of nitrate type, over the initial support containing alumina, silica or silica-alumina. By calcining at very high temperature, the mixed oxide phase containing cobalt and/or nickel is formed and stabilizes the whole of the support. The cobalt and/or nickel contained in the mixed oxide phase cannot be reduced during the final activation of the Fischer-Tropsch (reduction) catalyst. The cobalt and/or nickel contained in the mixed oxide phase does not therefore constitute the active phase of the catalyst.

According to step a0), a step of bringing a support comprising alumina, silica or silica-alumina into contact with at least one solution containing at least one precursor of cobalt and/or of nickel is carried out, then drying and calcining carried out at a temperature of between 700 and 1200° C., so as to obtain a mixed oxide phase containing cobalt and/or nickel in the support.

More particularly, the contacting step a0) may be carried out by impregnation, preferably dry impregnation, of a support comprising alumina, silica or silica-alumina, pre-formed or in powder form, with at least one aqueous solution containing the precursor of cobalt and/or of nickel, followed by a drying and a calcining at a temperature of between 700 and 1200° C.

The cobalt is brought into contact with the support by means of any cobalt precursor that is soluble in the aqueous phase. Preferably, the cobalt precursor is introduced in aqueous solution, for example in nitrate, carbonate, acetate or chloride form, in the form of complexes formed with acetylacetonates or of any other inorganic derivative soluble in aqueous solution, which is brought into contact with said support. The cobalt precursor advantageously used is cobalt nitrate or cobalt acetate.

The nickel is brought into contact with the support by means of any nickel precursor that is soluble in the aqueous phase. Preferably, said nickel precursor is introduced in aqueous solution, for example in nitrate, carbonate, acetate, chloride, hydroxide, hydroxycarbonate or oxalate form, in the form of complexes formed with acetylacetonates or of any other inorganic derivative soluble in aqueous solution, which is brought into contact with said support. The nickel precursor advantageously used is nickel nitrate, nickel chloride, nickel acetate or nickel hydroxycarbonate.

The total content of cobalt and/or of nickel, expressed as metal element, is advantageously between 1% and 20% by weight and preferably between 2% and 10% by weight relative to the weight of the final support.

The drying is advantageously carried out at a temperature of between 60° C. and 200° C., preferably for a period ranging from 30 minutes to three hours.

The calcining is carried out at a temperature of between 700 and 1200° C., preferably between 850 and 1200° C., and preferably between 850 and 900° C., generally for a period of between one hour and 24 hours and preferably between 2 hours and 5 hours. The calcining is generally carried out under an oxidizing atmosphere, for example in air, or in oxygen-depleted air; it may also be carried out at least partly under nitrogen. It makes it possible to convert the precursors of cobalt and/or of nickel and the alumina and/or silica into the mixed oxide phase containing cobalt and/or nickel.

According to one variant, the calcining may also be carried out in two steps, said calcining being advantageously carried out at a temperature of between 300° C. and 600° C. in air for a period of between half an hour and three hours, and then at a temperature of between 700° C. and 1200° C., preferably between 850 and 1200° C. and preferably between 850 and 900° C., generally for a period of between one hour and 24 hours, and preferably of between 2 hours and 5 hours.

Thus, at the conclusion of said step a0), said support comprising alumina, silica or silica-alumina also comprises a mixed oxide phase containing cobalt and/or nickel.

Step a)

The bringing of the organic compound used to carry out said step a) into contact with said support is carried out by impregnation, notably dry impregnation or excess impregnation, preferentially dry impregnation. Said organic compound is preferentially impregnated on said support after solubilization in a solution, preferably an aqueous solution.

The term "an organic compound containing at least oxygen and/or nitrogen" is understood here to mean a compound not comprising another heteroatom.

Preferably, said organic compound is chosen from a compound comprising one or more chemical functions chosen from a carboxylic, alcohol, ester, lactone, amine, amide, ether, dilactone, carboxyanhydride, carbonate, aldehyde, ketone, nitrile, imide, oxime or urea function.

When said organic compound comprises at least one or more carboxylic functions, said organic compound may be chosen from ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

When said organic compound comprises at least one or more alcohol functions, said organic compound may be chosen from methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

When said organic compound comprises at least one or more ester functions, said organic compound may be chosen from an ester, a diester, a γ-lactone, a δ-lactone or a carbonate containing between 4 and 8 carbon atoms, γ-butyrolactone, γ-valerolactone, methyl laurate, dimethyl malonate, dimethyl succinate and propylene carbonate.

When the organic compound comprises at least one or more amine functions, said organic compound may be chosen from aniline, ethylenediamine, diaminohexane, tetramethylenediamine, hexamethylenediamine, tetramethylethylenediamine, tetraethylethylenediamine, diethylenetriamine and triethylenetetramine.

When the organic compound comprises at least one or more amide functions, said organic compound may be chosen from formamide, N-methylformamide, N,N-dimethylformamide, 2-pyrrolidone, N-methyl-2-pyrrolidone, gamma-valerolactam and N,N'-dimethylurea.

When the organic compound comprises at least one or more ether functions, said organic compound may be chosen from organic compounds comprising at most two ether functions and not comprising any hydroxyl groups, chosen from the group of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of the cyclic ethers consisting of tetrahydrofuran, 1,4-dioxane and morpholine.

When the organic compound comprises a dilactone function, said organic compound may be chosen from the group of the cyclic dilactones having 4 ring members consisting of 1,2-dioxetanedione, or from the group of the cyclic dilactones having 5 ring members consisting of 1,3-dioxolane-4,5-dione, 1,5-dioxolane-2,4-dione, and 2,2-dibutyl-1,5-dioxolane-2,4-dione, or from the group of the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, or from the group of the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

When the organic compound comprises a carboxyanhydride function, said organic compound may be chosen from the group of the O-carboxyanhydrides consisting of 5-methyl-1,3-dioxolane-2,4-dione and 2,5-dioxo-1,3-dioxolane-4-propanoic acid, or from the group of the N-carboxyanhydrides consisting of 2,5-oxazolidinedione and 3,4-dimethyl-2,5-oxazolidinedione. "Carboxyanhydride" is understood to mean a cyclic organic compound comprising a carboxyanhydride function, that is to say a —CO—O—CO—X— or —X—CO—O—CO— sequence within the ring, with —CO— corresponding to a carbonyl function and X being able to be an oxygen or nitrogen atom. For X=O, reference is made to an O-carboxyanhydride, and when X=N, reference is made to an N-carboxyanhydride.

The molar ratio of organic compound introduced during step a) relative to the group VIII metal element introduced in step b) is between 0.01 and 2.0 mol/mol, preferably between 0.05 and 1.5 mol/mol.

Step b)

Step b) of bringing said porous support into contact with at least one solution containing at least one precursor of the active phase comprising at least one group VIII metal may be carried out by any method well known to those skilled in the art. Said porous support is preferentially carried out by impregnation of the support with at least one solution containing at least one precursor of the active phase comprising at least one group VIII metal. In particular, said step b) can be achieved by dry impregnation, by excess impregnation, or else by deposition-precipitation (as described in patents U.S. Pat. Nos. 5,874,381 and 6,534,436) according to methods well known to those skilled in the art. Preferably, said step b) is carried out by dry impregnation, which consists in bringing the catalyst support into contact with a solution containing at least one precursor of the active phase comprising at least one group VIII metal, the volume of which is equal to the pore volume of the support to be impregnated. This solution contains the precursor of the active phase at the desired concentration. The content of group VIII metal is advantageously between 1% and 60% by weight, preferably between 5% and 30% by weight and very preferably between 10% and 30% by weight, as group VIII metal element, relative to the total weight of the catalyst.

The group VIII metal is brought into contact with said support by means of any precursor of the active phase comprising a group VIII metal that is soluble in the aqueous phase or in the organic phase.

Preferably, the group VIII metal is cobalt. When introduced in organic solution, said cobalt precursor is, for example, cobalt acetate. Preferably, said cobalt precursor is introduced in aqueous solution, for example in nitrate, carbonate, acetate or chloride form, in the form of complexes formed with acetylacetonates or of any other inorganic derivative soluble in aqueous solution, which is brought into contact with said support. Use is advantageously made, as cobalt precursor, of cobalt nitrate or cobalt acetate.

The catalyst may advantageously further comprise at least one element chosen from an element from groups VIIIB, IA, IB, IIA, IIB, IIIA, IIIB and/or VA.

The preferred possible group VIIIB elements are platinum, ruthenium and rhodium. The preferred group IA elements are sodium and potassium. The preferred group IB elements are silver and gold. The preferred group IIA elements are manganese and calcium. The preferred group IIB element is zinc. The preferred group IIIA elements are boron and indium. The preferred group IIIB elements are lanthanum and cerium. The preferred group VA element is phosphorus.

The content of possible element from groups VIIIB, IA, IB, IIA, IIB, IIIA, IIIB and/or VA is between 50 ppm and 20% by weight, preferably between 100 ppm and 15% by weight, and more preferably between 100 ppm and 10% by weight expressed as element relative to the total weight of the catalyst.

According to one variant, when the catalyst contains one or several additional elements from groups VIIIB, IA, IB, IIA, IIB, IIIA, IIIB and/or VA, this or these elements may be either initially present on the support before the preparation of the catalyst, or introduced at any moment of the preparation and by any method known to those skilled in the art.

Implementation of Steps a) and b)

The process for preparing the catalyst according to the invention, notably steps a) and b), comprises several modes of implementation. They are distinguished in particular by the moment when the organic compound is introduced, which may be carried out either at the same time as the impregnation of the precursor of the active phase comprising a group VIII metal (co-impregnation) or after the impregnation of the precursor of the active phase (post-impregnation), or before the impregnation of the precursor of the active phase (pre-impregnation). In addition, it is possible to combine the embodiments.

A first mode of implementation consists in carrying out said steps a) and b) simultaneously so that said organic compound and at least said precursor of the active phase are co-impregnated on said support (co-impregnation). Said first mode of implementation advantageously comprises the implementation of one or more steps b). In particular, one or more steps b) advantageously precede(s) and/or follow(s) said co-impregnation step. Said first mode of implementation may comprise several co-impregnation steps.

A second mode of implementation consists in carrying out said step a) prior to said step b) (pre-impregnation). Advantageously, said step a) is followed by several steps b), preferably two steps b).

A third mode of implementation consists in carrying out said step b) prior to said step a) (post-impregnation). In accordance with said third mode of implementation, one or more steps b) of bringing the precursor of the active phase into contact precede(s) said step a).

Preferably, step a) is carried out before step b), which corresponds to the second mode of implementation.

When steps a) and b) are carried out separately (post-impregnation or pre-impregnation), a drying step is advantageously carried out between the impregnation steps. The intermediate drying step is carried out at a temperature below 200° C., advantageously between 50 and 180° C., preferably between 70 and 150° C., very preferably between 75 and 130° C. and optionally a maturation period was observed between the impregnation step and the intermediate drying step.

Each of the three modes of implementation described above may be carried out independently so that the catalyst according to the invention is prepared either according to said first mode of implementation, or according to said second mode of implementation or else according to said third mode of implementation.

However, it may be advantageous to combine said first mode with said second mode or with said third mode: both the group VIII metal present in the active phase and the organic compound are deposited at least twice on the catalyst support, namely at least once by co-impregnation and at least once by successive impregnation.

It may also be advantageous to carry out several times one or other of the three modes of implementation described above so as to bring the organic compound and the precursor of the active phase comprising at least one group VIII metal into contact with the support at least twice, preferably twice, in the same order of sequence of steps a) and b) according to one or other of the three embodiments described above. For example, for the second embodiment according to the invention, in which step a) is carried out before step b), the preparation process can be carried out in the order of the following steps: a0 (optional), a), c), b), d), a), c), b), d).

Advantageously, after each impregnation step, whether this is a step of impregnation of the precursor of the active phase or of the organic compound, the impregnated support can be left to mature. Maturation makes it possible for the impregnation solution to homogeneously disperse within the support. Any maturation step described in the present invention is advantageously carried out at atmospheric pressure, in a water-saturated atmosphere and at a temperature of between 17° C. and 50° C., and preferably at ambient temperature. Generally, a maturation time of between ten minutes and forty-eight hours, and preferably of between thirty minutes and five hours, is sufficient. Longer periods of time are not ruled out, but do not necessarily provide any improvement.

Any impregnation solution described in the present invention may comprise any polar solvent known to those skilled in the art. Said polar solvent used is advantageously chosen from the group formed by methanol, ethanol, water, phenol and cyclohexanol, taken alone or as a mixture. Said polar solvent can also advantageously be chosen from the group formed by propylene carbonate, DMSO (dimethyl sulfoxide), N-methylpyrrolidone (NMP) and sulfolane, taken alone or as a mixture. Preferably, a polar protic solvent is used. A list of the common polar solvents and also their dielectric constants can be found in the book *Solvents and Solvent Effects in Organic Chemistry*, C. Reichardt, Wiley-VCH, 3rd edition, 2003, pages 472-474. Very preferably, the solvent used is water or ethanol, and particularly preferably, the solvent is water. In one possible embodiment, the solvent can be absent from the impregnation solution.

Step c)

In accordance with the drying step c) of the implementation for the preparation of the catalyst, prepared according to at least one mode of implementation described above, the drying is carried out at a temperature of less than or equal to 200° C., advantageously between 50° C. and 180° C., preferably between 70° C. and 150° C., very preferably between 75° C. and 130° C. The drying step is preferentially carried out for a period of between 1 and 4 hours, preferably in an inert atmosphere or in an oxygen-containing atmosphere.

The drying step can be carried out by any technique known to those skilled in the art. It is advantageously carried out at atmospheric pressure or at reduced pressure. Preferably, this step is carried out at atmospheric pressure. It is advantageously carried out in a traversed bed using hot air or any other hot gas. Preferably, when the drying is carried out in a fixed bed, the gas used is either air or an inert gas, such as argon or nitrogen. Very preferably, the drying is carried out in a traversed bed in the presence of nitrogen and/or of air. Preferably, the drying step has a short duration of between 5 minutes and 4 hours, preferably between 30 minutes and 4 hours and very preferably between 1 hour and 3 hours.

According to a first variant, the drying is conducted so as to keep preferably at least 30% of the organic compound introduced during step b) of the preparation process, this amount preferably being greater than 50% and even more preferably greater than 70%, calculated on the basis of the carbon remaining on the catalyst.

On conclusion of the drying step c), a dried catalyst precursor is therefore obtained.

Step d)

According to an essential aspect of the preparation process according to the invention, on conclusion of the drying step c), a calcining step d) is carried out at a temperature greater than 200° C. and less than or equal to 1100° C., preferably at a temperature of between 250° C. and 600° C. under a stream of inert gas and/or oxidizing gas, preferably under a stream of oxidizing gas (preferably air), it being understood that the velocity of said gas stream, defined as the mass flow rate of said gas stream per volume of catalyst per hour, is greater than 1 litre per gram of catalyst and per hour, and is preferably between 1.5 and 5 litre per gram of catalyst and per hour.

Without wanting to be bound by any theory, the performing of a step of calcining the dried catalyst precursor in the presence of a gas stream at a relatively high velocity makes it possible to more rapidly eliminate the heat of the exothermic organic compound combustion reaction, which has a beneficial effect on the formation of the active phase of the catalyst.

The duration of this heat treatment is generally between 0.5 hours and 16 hours, preferably between 1 hour and 5 hours. After this treatment, the group VIII metal of the active phase is thus in oxide form and the catalyst contains no more or very little organic compound introduced during the synthesis thereof. However, the introduction of the organic compound during its preparation has left an imprint on the support of the catalyst, resulting in better dispersion of the active phase within the catalyst.

Step d) is advantageously carried out in a traversed bed or in a fluidized bed, preferably in a traversed bed, using air as gas stream.

Prior to its use in the Fischer-Tropsch synthesis catalytic reactor, the catalyst obtained on conclusion of step d) generally undergoes a reducing treatment, for example under pure or diluted hydrogen, at high temperature, intended to activate the catalyst and to form particles of metal in the zero-valent state (in metal form). This treatment is carried out in-situ (in the same reactor as the one where the Fischer-Tropsch synthesis is carried out) or ex-situ before being loaded into the reactor. The temperature of this reducing treatment is preferentially between 200 and 500° C. and the duration thereof is generally between 2 and 20 hours.

Catalyst

The catalyst obtained by means of the preparation process described above comprises, preferably consists of, an active phase comprising, preferably consisting of, at least one group VIII metal and a porous support based on alumina, silica or silica-alumina, and optionally a mixed oxide phase containing cobalt and/or nickel.

The content of group VIII metal is advantageously between 1% and 60% by weight, preferably between 5% and 30% by weight and very preferably between 10% and 30% by weight, as group VIII metal element, relative to the total weight of the catalyst.

Preferably, the group VIII metal is cobalt.

The specific surface area of the catalyst is generally between 50 m$^2$/g and 500 m$^2$/g, preferably between 80 m$^2$/g and 250 m$^2$/g, more preferably between 90 m$^2$/g and 150 m$^2$/g. The pore volume of said catalyst is generally between 0.2 ml/g and 1 ml/g, and preferably between 0.25 ml/g and 0.8 ml/g.

Support

The support of the catalyst prepared according to the process according to the invention is based on alumina, silica or silica-alumina, and optionally a mixed oxide phase containing cobalt and/or nickel.

When the support is a silica-alumina, the silica (SiO2) content can range from 0.5% by weight to 30% by weight relative to the weight of the support, preferably between 0.6% and 15% by weight.

According to one variant, said porous support also contains a phase of mixed oxide containing cobalt and/or nickel. According to this variant, the content of the mixed oxide phase in the support is between 0.1% and 50% by weight relative to the weight of the support. Preferably, the mixed oxide phase comprises an aluminate of formula $CoAl_2O_4$ or $NiAl_2O_4$ in the case of an alumina-based or silica-alumina-based support, or a silicate of formula $Co_2SiO_4$ or $Ni_2SiO_4$ in the case of a silica-based or silica-alumina-based support. A phase of mixed oxide containing cobalt and/or nickel is understood to mean a phase in which cations of cobalt and/or of nickel are combined with the $O^{2-}$ oxide ions of the alumina and/or silica support thus forming a mixed phase containing the aluminates and/or silicates containing cobalt and/or nickel.

The mixed oxide phase may be in amorphous form or in crystalline form. When the support is based on alumina, the mixed oxide phase may comprise an aluminate of formula $CoAl_2O_4$ or $NiAl_2O_4$, in amorphous or crystalline form, for example in spinel form. When the support is based on silica, the mixed oxide phase may comprise a silicate of formula $Co_2SiO_4$ or $Ni_2SiO_4$ (cobalt orthosilicate or nickel orthosilicate), in amorphous or crystalline form. When the support is based on silica-alumina, the mixed oxide phase may comprise an aluminate of formula $CoAl_2O_4$ or $NiAl_2O_4$ in amorphous or crystalline form, for example in spinel form, and/or a silicate of formula $Co_2SiO_4$ or $Ni_2SiO_4$, in amorphous or crystalline form.

The cobalt and/or nickel contained in the mixed oxide phase cannot be reduced during the final activation of the Fischer-Tropsch (reduction) catalyst. The cobalt and/or nickel contained in the mixed oxide phase does not therefore constitute the active phase of the catalyst.

The presence of a mixed oxide phase in the catalyst according to the invention is measured by temperature-programmed reduction (or TPR) such as for example described in Oil & Gas Science and Technology, Rev. IFP, Vol. 64 (2009), No. 1, pp. 11-12. According to this technique, the catalyst is heated in a stream of a reducing agent, for example in a stream of dihydrogen. The measurement of the dihydrogen consumed as a function of the temperature gives quantitative information regarding the reducibility of the species present. The presence of a mixed oxide phase in the catalyst is thus expressed by a consumption of dihydrogen at a temperature above around 800° C.

In one embodiment according to the invention, the support consists of a silica-alumina and of a mixed oxide phase containing cobalt and/or nickel, preferably containing cobalt.

The specific surface area of the support is generally between 50 $m^2/g$ and 500 $m^2/g$, preferably between 100 $m^2/g$ and 300 $m^2/g$, more preferably between 150 $m^2/g$ and 250 $m^2/g$.

The pore volume of said support is generally between 0.3 ml/g and 1.2 ml/g, and preferably between 0.4 ml/g and 1 ml/g.

The pore distribution of the pores of the porous support may be of monomodal, bimodal or plurimodal type Preferably, it is of monomodal type. The pore size is about from 2 to 50 nm, with an average pore size between 5 and 25 nm, preferably between 8 and 20 nm.

The support may have a morphology in the form of beads, extrudates (for example of trilobe or quadrilobe shape) or pellets, especially when said catalyst is used in a reactor operating as a fixed bed, or may have a morphology in the form of a powder of variable particle size, especially when said catalyst is used in a slurry bubble column. Preferably, the support is in the form of a powder having a particle size of between 10 and 500 µm.

The support can be provided by any means known to those skilled in the art.

Fischer-Tropsch Process

Another subject according to the invention relates to a Fischer-Tropsch process in the presence of a catalyst prepared according to the preparation process according to the invention. This Fischer-Tropsch process leads to the production of essentially linear and saturated $C_5^+$ hydrocarbons (having at least 5 carbon atoms per molecule). The hydrocarbons produced by the process of the invention are thus essentially paraffinic hydrocarbons, the fraction of which having the highest boiling points can be converted with a high yield to middle distillates (gas oil and kerosene cuts) by a hydroconversion process such as catalytic hydrocracking and/or hydroisomerization.

The feedstock used for the implementation of the process of the invention comprises synthesis gas. Synthesis gas is a mixture comprising in particular carbon monoxide and hydrogen having $H_2/CO$ molar ratios that may vary in a ratio of 0.5 to 4 depending on the process by which it was obtained. The $H_2/CO$ molar ratio of the synthesis gas is generally close to 3 when the synthesis gas is obtained from the hydrocarbon or alcohol steam reforming process. The $H_2/CO$ molar ratio of the synthesis gas is of the order of 1.5 to 2 when the synthesis gas is obtained from a partial oxidation process. The $H_2/CO$ molar ratio of the synthesis gas is generally close to 2.5 when it is obtained from a thermal reforming process. The $H_2/CO$ molar ratio of the synthesis gas is generally close to 1 when it is obtained from a process for gasification and reforming of $CO_2$.

The catalyst used in the hydrocarbon synthesis process according to the invention is preferably carried out in ebullated-bed or else three-phase fluidized-bed reactors. The implementation of the catalyst suspended in a three-phase fluidized reactor, preferentially of bubble column type, is preferred. In this preferred use of the catalyst, said catalyst forms a suspension with the reaction medium. This technology is also known under the "slurry" process terminology by those skilled in the art.

The hydrocarbon synthesis process according to the invention is performed under a total pressure of between 0.1 MPa and 15 MPa, preferably between 0.5 MPa and 10 MPa, under a temperature of between 150° C. and 350° C., preferably between 180° C. and 270° C. The hourly space velocity is advantageously between 100 and 20 000 volumes of synthesis gas per volume of catalyst and per hour (100 to 20 000 $h^{-1}$) and preferably between 400 and 10 000 volumes of synthesis gas per volume of catalyst and per hour (400 to 10 000 $h^{-1}$).

In order to illustrate the invention and to allow those skilled in the art to carry it out, various embodiments of the process for preparing cobalt-based supported catalysts and the use thereof in Fischer-Tropsch synthesis are presented below; however, this could not limit the scope of the invention.

EXAMPLES

Example 1 (Comparative): Catalyst A of Formula Co/CoAl$_2$O$_4$—Al$_2$O$_3$·SiO$_2$ Containing γ-Valerolactone and Calcined With an Air Velocity of 0.7 Litres of Air Per Gram of Catalyst and Per Hour The spinel present in the support of the catalyst A is a simple spinel formed of cobalt aluminate, which is included in a silica-alumina containing 5% by weight of $SiO_2$, having an average particle size equal to 80 µm and having a specific surface area of 180 $m^2/g$ and a pore volume of 0.55 ml/g. The preparation of the spinel included in the silica-alumina is carried out by dry impregnation of an aqueous solution of cobalt nitrate (Orrion Chemicals Metalchem, ~13% by weight Co) so as to introduce 5% by weight of cobalt into said silica-alumina. After drying at 120° C. for 3 hours, the solid is calcined at 850° C. for 4 hours in air. The support for the catalyst A is formed of 5% by weight of cobalt in the form of cobalt aluminate in the silica-alumina.

The γ-valerolactone is deposited on the support described above by dry impregnation of a solution of γ-valerolactone, at a concentration such that the γ-valerolactone/Co molar ratio is 1.0 mol/mol. After dry impregnation, the solid undergoes a maturation in a water-saturated atmosphere for 9 hours at ambient temperature and is then dried in an oven at 120° C. for 3 hours. The active phase based on cobalt is then deposited on the dried solid by dry impregnation of a solution containing cobalt nitrate in a γ-valerolactone/Co molar ratio of 1.0 mol/mol. After the step of dry impregnation of the cobalt on the support, the solid undergoes a maturation in a water-saturated atmosphere for 9 hours at ambient temperature and is then dried in a traversed bed at 120° C. for 3 hours in air. The dried solid is then calcined in air at 400° C. for 4 hours in a transversed bed with an air velocity of 0.7 litre of air/gram of catalyst and per litre (l/g·h).

The above steps (impregnation of γ-valerolactone, maturation, drying, impregnation of the active phase based on cobalt, maturation, drying then calcining) are each carried out a second time in the same order in order to obtain a final catalyst A having a total cobalt content of 20% by weight (the content of Co present in the spinel phase being included), i.e. 15% by weight of cobalt as active phase.

Example 2 (According to the Invention): Catalyst B of Formula Co/CoAl$_2$O$_4$—Al$_2$O$_3$·SiO$_2$ Containing γ-Valerolactone and Calcined With an Air Velocity of 2 Litres of Air Per Gram of Catalyst and Per Hour The catalyst B is prepared using the same support as that used for the catalyst A, and by carrying out the same steps as those performed to obtain the catalyst A, the only difference being that the calcining step is carried out in air at 400° C. for 4 hours in a traversed bed with an air velocity of 2 litres of air/gram of catalyst and per hour (l/g·h).

The final catalyst B has a total cobalt content of 20% by weight (the content of Co present in the spinel phase being included), i.e. 15% by weight of cobalt as active phase.

Example 3 (According to the Invention): Catalyst C of Formula Co/CoAl$_2$O$_4$—Al$_2$O$_3$·SiO$_2$ Containing γ-Valerolactone and Calcined With an Air Velocity of 3 Litres of Air Per Gram of Catalyst and Per Hour The catalyst C is prepared using the same support as that used for the catalyst A, and by carrying out the same steps as those performed to obtain the catalyst A, the only difference being that the calcining step is carried out in air at 400° C. for 4 hours in a traversed bed with an air velocity of 3 litres of air/gram of catalyst and per hour (l/g·h).

The final catalyst C has a total cobalt content of 20% by weight (the content of Co present in the spinel phase being included), i.e. 15% by weight of cobalt as active phase.

Example 4 (According to the Invention): Catalyst D of Formula Co/CoAl$_2$O$_4$—Al$_2$O$_3$·SiO$_2$ Containing γ-Valerolactone and Calcined With an Air Velocity of 4 Litres of Air Per Gram of Catalyst and Per Hour The catalyst D is prepared using the same support as that used for the catalyst A, and by carrying out the same steps as those performed to obtain the catalyst A, the only difference being that the calcining step is carried out in air at 400° C. for 4 hours in a traversed bed with an air velocity of 4 litres of air/gram of catalyst and per hour (l/g·h).

The final catalyst D has a total cobalt content of 20% by weight (the content of Co present in the spinel phase being included), i.e. 15% by weight of cobalt as active phase.

Example 5: Catalytic Performances of the Catalysts A to D in Fischer-Tropsch Reaction The catalysts A to D, before being successively tested in conversion of the synthesis gas, are reduced ex-situ under a stream of pure hydrogen at 400° C. for 16 hours in a tubular reactor. Once the catalyst has been reduced, it is discharged under an argon atmosphere and coated in the wax Sasolwax® to be stored with exclusion of air before testing. The Fischer-Tropsch synthesis reaction is carried out in a three-phase reactor (also referred to as slurry technology (operating continuously and operating with a concentration of 10% (vol) of catalyst in dispersed phase. The test conditions are the following: temperature=220° C.; total pressure=2 MPa; H$_2$/CO molar ratio=2. The conversion of the CO is maintained at 60% throughout the duration of the test. The test conditions are adjusted so as to be at iso conversion of CO regardless of the activity of the catalyst. The results, in terms of activity, were calculated, after 150 hours of test, for the catalysts A to D relative to the catalyst A serving as reference, and are shown in Table 1 below. The methane-formation selectivities are also given.

TABLE 1

Catalytic performances of the catalysts A to D

| Catalysts | Calcining air velocity (litres air/gram of catalyst/h) | Relative activity after 150 hours of test | Methane formation selectivity (%) |
|---|---|---|---|
| A (not in accordance with the invention) | 0.7 | 100 (base) | 7.0 |
| B (not in accordance) | 2.0 | 120 | 6.6 |
| C (compliant) | 3.0 | 125 | 6.7 |
| D (in accordance with the invention) | 4.0 | 130 | 6.5 |

The results of Table 1 above show the catalytic performances of the catalysts A to D both in terms of activity and in terms of selectivity. It appears that the catalysts prepared by means of the process according to the invention with an air velocity during the calcining step of greater than 1 litre of air/gram of catalyst per hour, after 150 hours of test, show improved relative activities compared to the catalyst A of Example 1, the air velocity of which during the calcining step is less than 1 litre of air/gram of catalyst and per hour.

The invention claimed is:

1. A process for preparing a catalyst containing an active phase based on at least one group VIII metal and a porous support based on alumina, silica or silica-alumina, said catalyst being prepared by at least the following steps:
   a) said support is brought into contact with at least one organic compound comprising at least oxygen and/or nitrogen;
   b) said porous support is brought into contact with at least one solution containing at least one precursor of the active phase comprising at least one group VIII metal, it being possible for steps a) and b) to be carried out separately, in any order, or simultaneously;
   c) the catalyst precursor obtained on conclusion of the sequence of steps a) and b) is dried at a temperature of less than or equal to 200° C., so as to obtain a dried catalyst precursor;
   d) the dried catalyst precursor obtained on conclusion of step c) is calcined at a temperature greater than 200° C. and less than 1100° C. under a stream of inert gas and/or of oxidizing gas, it being understood that the velocity of said gas stream, defined as the volumetric flow rate of said gas stream per mass of catalyst per hour, is greater than 1 litre per gram of catalyst and per hour.

2. The process according to claim 1, in which, in step d), the velocity of the gas stream is between 1 and 5 litres per gram of catalyst and per hour.

3. The process according to claim 1, in which step a) is carried out before step b).

4. The process according to claim 1, in which said organic compound is chosen from a compound comprising one or more chemical functions chosen from a carboxylic, alcohol, ester, amine, amide, ether, dilactone, carboxyanhydride, aldehyde, ketone, nitrile, imide, oxime and urea function.

5. The process according to claim 4, in which said organic compound comprises at least one carboxylic function chosen from ethanedioic acid (oxalic acid), propanedioic acid (malonic acid), butanedioic acid (succinic acid), 4-oxopentanoic acid (levulinic acid) and 3-carboxy-3-hydroxypentanedioic acid (citric acid).

6. The process according to claim 4, in which said organic compound comprises at least one alcohol function chosen from methanol, ethanol, phenol, ethylene glycol, propane-1,3-diol, glycerol, sorbitol, diethylene glycol, polyethylene glycols having an average molar mass of less than 600 g/mol, glucose, fructose and sucrose in any of the isomeric forms thereof.

7. The process according to claim 4, in which said organic compound comprises at least one ester function chosen from a γ-lactone or a δ-lactone containing between 4 and 8 carbon atoms, γ-butyrolactone, γ-valerolactone, methyl laurate, dimethyl malonate, dimethyl succinate and propylene carbonate.

8. The process according to claim 4, in which said organic compound comprises at least one amine function chosen from aniline, ethylenediamine, diaminohexane, tetramethylenediamine, hexamethylenediamine, tetramethylethylenediamine, tetraethylethylenediamine, diethylenetriamine and triethylenetetramine.

9. The process according to claim 4, in which said organic compound comprises at least one amide function chosen from formamide, N-methylformamide, N,N-dimethylformamide, 2-pyrrolidone, N-methyl-2-pyrrolidone, gamma-valerolactam and N,N'-dimethylurea.

10. The process according to claim 4, in which said organic compound comprises at least one carboxyanhydride function chosen from the group of the O-carboxyanhydrides consisting of 5-methyl-1,3-dioxolane-2,4-dione and 2,5-dioxo-1,3-dioxolane-4-propanoic acid, or from the group of the N-carboxyanhydrides consisting of 2,5-oxazolidinedione and 3,4-dimethyl-2,5-oxazolidinedione.

11. The process according to claim 4, in which said organic compound comprises at least one dilactone function chosen from the group of the cyclic dilactones having 4 ring members consisting of 1,2-dioxetanedione, or from the group of the cyclic dilactones having 5 ring members consisting of 1,3-dioxolane-4,5-dione, 1,5-dioxolane-2,4-dione, and 2,2-dibutyl-1,5-dioxolane-2,4-dione, or from the group of the cyclic dilactones having 6 ring members consisting of 1,3-dioxane-4,6-dione, 2,2-dimethyl-1,3-dioxane-4,6-dione, 2,2,5-trimethyl-1,3-dioxane-4,6-dione, 1,4-dioxane-2,5-dione, 3,6-dimethyl-1,4-dioxane-2,5-dione, 3,6-diisopropyl-1,4-dioxane-2,5-dione, and 3,3-ditoluyl-6,6-diphenyl-1,4-dioxane-2,5-dione, or from the group of the cyclic dilactones having 7 ring members consisting of 1,2-dioxepane-3,7-dione, 1,4-dioxepane-5,7-dione, 1,3-dioxepane-4,7-dione and 5-hydroxy-2,2-dimethyl-1,3-dioxepane-4,7-dione.

12. The process according to claim 4, in which said organic compound comprises at least one ether function comprising at most two ether functions and not comprising any hydroxyl groups, chosen from the group of the linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of the cyclic ethers consisting of tetrahydrofuran, 1,4-dioxane and morpholine.

13. The process according to claim 1, in which the molar ratio of the organic compound introduced during step a) relative to the group VIII metal element introduced in step b) is between 0.01 and 2.0 mol/mol.

14. The process according to claim 1, in which the content of group VIII metal introduced during step b) is between 1% and 60% by weight expressed as group VIII metal element relative to the total weight of the catalyst.

15. The process according to claim 1, in which the group VIII metal is cobalt.

16. The process according to claim 1, comprising a step a0) before step a) in which said porous support is brought into contact with at least one solution containing at least one precursor of cobalt and/or of nickel, then drying and calcining at a temperature of between 700° C. and 1200° C., so as to obtain a mixed oxide phase containing cobalt and/or nickel in the support.

17. The process according to claim 16, in which the content of the mixed oxide phase in the support is between 0.1% and 50% by weight relative to the weight of the support.

18. The process according to claim 16, in which the silica content of said support is between 0.5% by weight and 30% by weight relative to the weight of the support before the formation of the mixed oxide phase when the support is a silica-alumina.

19. A Fischer-Tropsch process for synthesizing hydrocarbons, which comprises bringing a feedstock comprising synthesis gas into contact with a catalyst obtained by the process as claimed in claim 1, under a total pressure of between 0.1 and 15 MPa, at a temperature of between 150° C. is and 350° C., and at an hourly space velocity of between 100 and 20 000 volumes of synthesis gas per volume of catalyst and per hour with an $H_2$/CO molar ratio of the synthesis gas of between 0.5 and 4.

* * * * *